(12) United States Patent
Otomaru et al.

(10) Patent No.: US 10,768,131 B2
(45) Date of Patent: Sep. 8, 2020

(54) SENSOR SUBSTRATE ARRANGEMENT FOR A PARTICULATE SENSOR DEVICE

(71) Applicant: KYOCERA Corporation, Kyoto-shi, Kyoto (JP)

(72) Inventors: Hidekazu Otomaru, Kirishima (JP); Takashi Kimura, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 186 days.

(21) Appl. No.: 15/752,133

(22) PCT Filed: Nov. 9, 2016

(86) PCT No.: PCT/JP2016/083298
§ 371 (c)(1),
(2) Date: Feb. 12, 2018

(87) PCT Pub. No.: WO2017/090434
PCT Pub. Date: Jun. 1, 2017

(65) Prior Publication Data
US 2018/0238821 A1    Aug. 23, 2018

(30) Foreign Application Priority Data

Nov. 25, 2015  (JP) .................................. 2015-229451
May 20, 2016  (JP) .................................. 2016-101971

(51) Int. Cl.
*G01N 27/04*    (2006.01)
*G01N 15/06*    (2006.01)
(Continued)

(52) U.S. Cl.
CPC ......... *G01N 27/04* (2013.01); *B01D 46/0084* (2013.01); *G01N 15/0606* (2013.01); *G01N 15/0656* (2013.01); *G01N 2015/0046* (2013.01)

(58) Field of Classification Search
None
See application file for complete search history.

(56) References Cited

U.S. PATENT DOCUMENTS 4,307,061 A    12/1981  Sarholz
4,909,922 A *   3/1990  Kato .................. G01N 27/4067
                                                  204/406
(Continued)

FOREIGN PATENT DOCUMENTS

CN    101629926 A    1/2010
EP       2725339 A2    4/2014
(Continued)

OTHER PUBLICATIONS

International Search Report, PCT/JP2016/083298, dated Jan. 24, 2017, 2 pgs.

*Primary Examiner* — Peter J Macchiarolo
*Assistant Examiner* — Jermaine L Jenkins
(74) *Attorney, Agent, or Firm* — Volpe and Koenig, P.C.

(57) ABSTRACT

There are provided a sensor substrate and a sensor device which have high detection accuracy. A sensor substrate includes an insulating substrate; sensing electrodes disposed in the insulating substrate, the sensing electrodes being columnar and being composed of at least one pair of positive and negative sensing electrodes, in the at least one pair of positive and negative sensing electrodes, part of a positive electrode and part of a negative electrode being each exposed from one surface of the insulating substrate; and innerlayer wiring lines embedded within the insulating substrate, the innerlayer wiring lines corresponding to the positive electrode and the negative electrode, respectively, in the at least one pair of positive and negative sensing electrodes.

15 Claims, 16 Drawing Sheets

(51) Int. Cl.
  *B01D 46/00*  (2006.01)
  *G01N 15/00*  (2006.01)

(56) References Cited

U.S. PATENT DOCUMENTS

| | | | |
|---|---|---|---|
| 8,823,401 B2* | 9/2014 | Roth | G01N 15/0656 |
| | | | 324/699 |
| 9,217,349 B2* | 12/2015 | Hashida | G01N 15/0606 |
| 9,528,971 B2* | 12/2016 | Teranishi | G01N 33/0047 |
| 9,803,524 B2* | 10/2017 | Kubinski | F01N 3/027 |
| 9,964,529 B2* | 5/2018 | Bessen | G01N 15/0656 |
| 10,067,048 B2* | 9/2018 | Tiefenbach | G01N 27/125 |
| 10,088,405 B2* | 10/2018 | Baars | F02D 41/042 |
| 10,338,019 B2* | 7/2019 | Kimura | G01N 15/0656 |
| 10,408,776 B2* | 9/2019 | Otomaru | G01N 15/06 |
| 2002/0078916 A1 | 6/2002 | Altmann et al. | |
| 2009/0217737 A1 | 9/2009 | Dorfmueller et al. | |
| 2012/0047991 A1 | 3/2012 | Tokuda et al. | |
| 2012/0047993 A1 | 3/2012 | Tokuda et al. | |
| 2012/0151992 A1* | 6/2012 | Harada | G01N 15/0656 |
| | | | 73/23.33 |
| 2015/0084100 A1 | 3/2015 | Sablong et al. | |
| 2015/0153249 A1* | 6/2015 | Goulette | G01N 15/0606 |
| | | | 73/23.31 |
| 2016/0334321 A1* | 11/2016 | Koike | G01M 15/102 |
| 2018/0266936 A1* | 9/2018 | Yamamoto | G01N 15/1056 |

FOREIGN PATENT DOCUMENTS

| | | |
|---|---|---|
| JP | 55-030690 A | 3/1980 |
| JP | 59-197847 A | 11/1984 |
| JP | 02-102444 A | 4/1990 |
| JP | 02-181641 A | 7/1990 |
| JP | 07-248303 A | 9/1995 |
| JP | 08-278269 A | 10/1996 |
| JP | 2002-195114 A | 7/2002 |
| JP | 2004-144609 A | 5/2004 |
| JP | 2012-013639 A | 1/2012 |
| JP | 2012-047596 A | 3/2012 |
| JP | 2012-078130 A | 4/2012 |
| JP | 2012-168193 A | 9/2012 |
| JP | 2014-032063 A | 2/2014 |

* cited by examiner

SENSOR SUBSTRATE ARRANGEMENT FOR A PARTICULATE SENSOR DEVICE

TECHNICAL FIELD

The present invention relates to a sensor substrate comprising an insulating substrate and an electrode mounted to the insulating substrate, and to a sensor device.

BACKGROUND ART

A DPF (Diesel Particulate Filter), etc. is installed for trapping particular matter (PM) composed predominantly of soot contained in exhaust gas from automobiles, etc., and as a PM detection sensor for detecting failure of the DPF, etc., for example, as described in Patent Literature 1, there is disclosed a particulate matter detecting device comprising an insulating substrate formed of a ceramic sintered body such as an aluminum oxide sintered body, a sensing electrode formed on a surface of the insulating substrate by a thick-film printing technique (screen printing method), and so forth. This device detects particulate matter based on variation in electrical characteristics resulting from accumulation of detection targets, such as PM, contained in exhaust gas in between a pair of sensing electrodes.

Meanwhile, for example, as described in Patent Literature 2, there is disclosed a method of manufacturing a PM detection sensor having a pair of electrodes, the method of forming a pair of sensing electrodes, etc. by other technique than the thick-film printing technique (more specifically, the method comprising forming a laminate structure by laminating sensing electrodes, etc. one after another in a width direction thereof, and slicing the laminate structure in a predetermined thickness by means of dicing saw or otherwise).

Moreover, for example, as described in Patent Literature 3 or Patent Literature 4, as a sensor substrate which is used for an exhaust gas sensor or the like, there is used a sensor substrate comprising an insulating substrate formed of a ceramic sintered body such as an aluminum oxide sintered body, and a pair of sensing electrodes disposed on a surface of the insulating substrate.

For example, on the basis of variation in resistance value or current value caused by accumulation of detection targets contained in exhaust gas in between a pair of the sensing electrodes, the content, etc. of the detection targets in the exhaust gas can be detected.

The capability of detecting detection targets contained in exhaust gas with high accuracy is demanded in the above-described sensor substrate and sensor device.

CITATION LIST

Patent Literature

Patent Literature 1: Japanese Unexamined Patent Publication JP-A 2012-47596
Patent Literature 2: Japanese Unexamined Patent Publication JP-A 2014-32063
Patent Literature 3: Japanese Unexamined Patent Publication JP-A 55-30690 (1980)
Patent Literature 4: Japanese Unexamined Patent Publication JP-A 59-197847 (1984)

SUMMARY OF INVENTION

A sensor substrate according to the present disclosure comprises: an insulating substrate; sensing electrodes disposed in the insulating substrate, the sensing electrodes being columnar and being composed of at least one pair of positive and negative sensing electrodes; and innerlayer wiring lines embedded within the insulating substrate. In the at least one pair of positive and negative sensing electrodes, part of a positive electrode and part of a negative electrode are each exposed from one surface of the insulating substrate. The innerlayer wiring lines, which are embedded within the insulating substrate, correspond to the positive electrode and the negative electrode, respectively, in the at least one pair of positive and negative sensing electrodes.

A sensor device according to the present disclosure comprises: the sensor substrate mentioned above; and a power source which supplies electric power to the at least one pair of positive and negative sensing electrodes via the innerlayer wiring lines.

BRIEF DESCRIPTION OF DRAWINGS

Other and further objects, features, and advantages of the invention will be more explicit from the following detailed description taken with reference to the drawings wherein.

DESCRIPTION OF EMBODIMENTS

Now, a sensor substrate and a sensor device according to embodiments of the invention will be described with reference to accompanying drawings. In what follows, the opposite sides of the construction will be defined specifically as, for example, the upper surface, etc., for the purpose of convenience in explanation, it being understood that such a definition is not intended to be limiting of the orientation of the sensor substrate, etc. in actual use.

First Embodiment

Figure 1A:
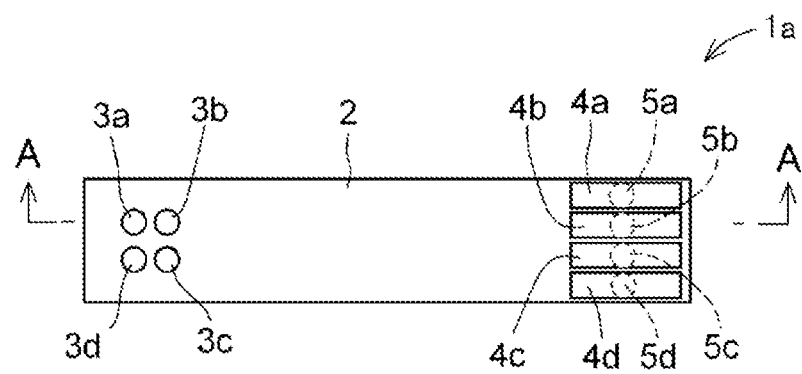
FIG. 1A is a top view of a sensor substrate according a first embodiment.
Figure 1B:
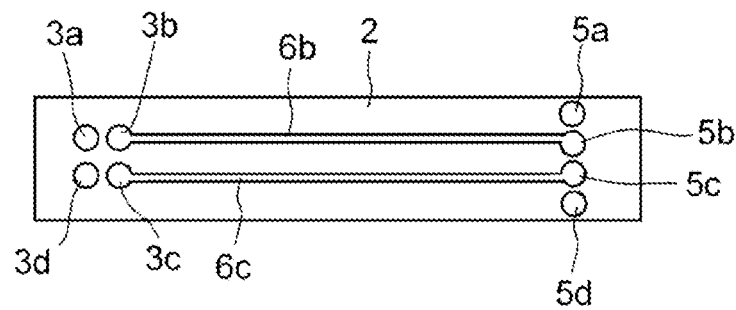
FIG. 1B is a view showing a wiring configuration in a second layer of the sensor substrate according to the first embodiment.
Figure 1C:
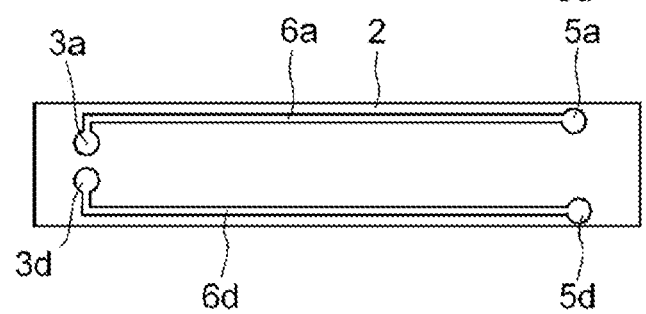
FIG. 1C is a view showing a wiring configuration in a third layer of the sensor substrate according to the first embodiment.
Figure 1D:
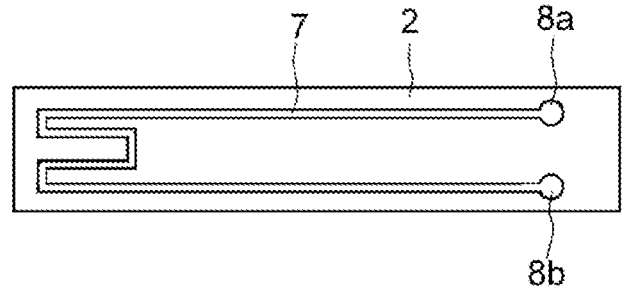
FIG. 1D is a view showing the configuration of a heat-generating electrode in a fourth layer of the sensor substrate according to the first embodiment.
Figure 1E:
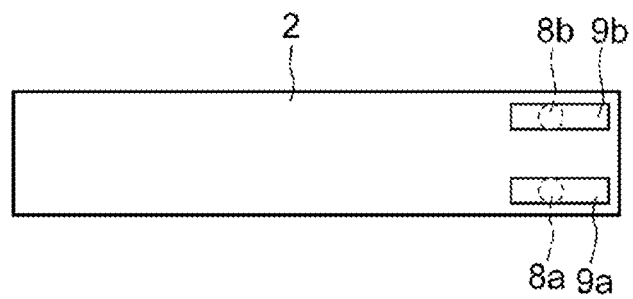
FIG. 1E is a backside view of the sensor substrate according to the first embodiment.
Figure 2:
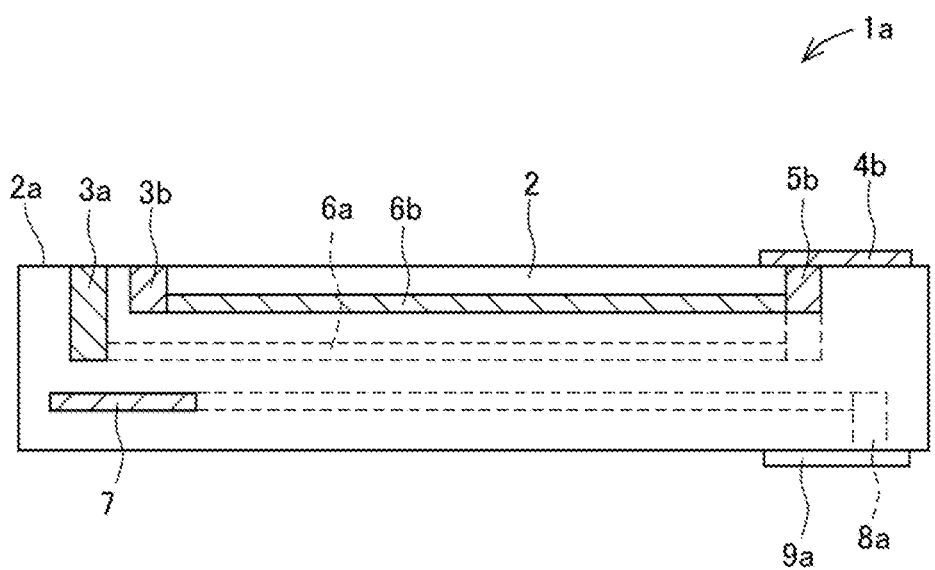
FIG. 2 is a sectional view taken along the line A-A of FIG. 1A.

FIGS. 1A to 1E are drawings showing a structural example of a multilayer-structured sensor substrate according to a first embodiment of the invention. FIG. 1A is a top view of a sensor substrate 1a, FIG. 1B is a view showing a wiring configuration in a second layer of the sensor substrate 1a, FIG. 1C is a view showing a wiring configuration in a third layer of the sensor substrate 1a, FIG. 1D is a view showing the configuration of a heat-generating electrode in a fourth layer of the sensor substrate 1a, and FIG. 1E is a backside view of the sensor substrate 1a. In addition, FIG. 2 is a sectional view taken along the line A-A of FIG. 1A.

For example, the sensor substrate 1a is used in a sensor device for detecting particulate matter (PM) contained in exhaust gas from a diesel engine vehicle or a gasoline engine vehicle (which is disposed in an exhaust passage for automotive exhaust gas, for example). The sensor substrate 1a comprises: an insulating substrate 2; sensing electrodes 3a and 3b disposed in the insulating substrate, the sensing electrodes being columnar and being composed of at least one pair of positive and negative sensing electrodes; and innerlayer wiring lines 6a and 6b, which are embedded within the insulating substrate 2, corresponding to the sensing electrodes 3a and 3b, respectively.

The sensor substrate 1a achieves, as a feature thereof, an increase in the detection sensitivity of particulate matter, etc. by the narrowing of a gap between the sensing electrodes when incorporated in a sensor device.

As shown in FIGS. 1A to 1E and FIG. 2, in a first layer, the second layer, or the third layer of the sensor substrate 1a, there are provided electrode terminals 4a to 4d, internal wiring lines 5a to 5d, and innerlayer wiring lines 6a to 6d corresponding to sensing electrodes 3a to 3d. Moreover, a heat-generating electrode 7 is embedded within the fourth layer of the sensor substrate 1a, and, the fourth layer or the fifth layer is provided with internal wiring lines 8a and 8b and connection pads 9a and 9b corresponding to the positive and negative sides of the heat-generating electrode 7.

In this embodiment, the sensing electrodes 3a to 3d are each, for example, a cylindrical electrode, the upper surface of which is exposed from a first face 2a which is one surface of the insulating substrate 2, and, each upper surface is flush with the first face 2a. The sensing electrode 3a is connected, through the internal wiring line 5a connected to the innerlayer wiring line 6a of the third layer and the electrode terminal 4a of the first layer, to a positive electrode of an external DC power supply (not shown) (for example, 50 [V]). The sensing electrode 3b is connected, through the internal wiring line 5b connected to the innerlayer wiring line 6b of the second layer and the electrode terminal 4b of the first layer, to a negative electrode of the above-described external DC power supply. Like the sensing electrode 3a, the sensing electrode 3c is connected, through the internal wiring line 5c, to the positive electrode of the above-described DC power supply, and, like the sensing electrode 3b, the sensing electrode 3d is connected, through the internal wiring line 5d, to the negative electrode of the above-described DC power supply. Thus, the sensing electrode 3a constitutes, in conjunction with the sensing electrode 3b or the sensing electrode 3d, a pair of positive and negative sensing electrodes, and, the sensing electrode 3c constitutes, in conjunction with the sensing electrode 3b or the sensing electrode 3d, a pair of positive and negative sensing electrodes.

The heat-generating electrode 7 is connected, through the connection pads 9a and 9b, to an external DC power supply (not shown) (for example, 20 [V]). The heat-generating electrode 7 is heated to, for example, 700 [° C.] for decomposition and removal of particulate matter (PM) adhering to the first face 2a.

The insulating substrate 2 has the form of, for example, a quadrangular flat plate, and serves as a base body portion for electrically insulating the pair of sensing electrodes as well as the pair of sensing electrodes and the heat-generating electrode from each other. The insulating substrate 2 is formed of a ceramic sintered body such for example as an aluminum oxide sintered body, an aluminum nitride sintered body, a mullite sintered body, a glass ceramic sintered body, or zirconia ceramic (zirconium oxide sintered body). The insulating substrate 2 may be composed of a stack of a plurality of insulating layers formed of such a ceramic sintered body.

For example, in the case where the insulating substrate 2 is composed of a stack of a plurality of insulating layers formed of an aluminum oxide sintered body, the insulating substrate 2 is produced by the following steps.

To begin with, powder of raw materials such as silicon oxide ($SiO_2$), magnesium oxide (MgO), and manganese oxide ($Mn_2O_3$) serving as sintering aids is added to powder of aluminum oxide ($Al_2O_3$) which constitutes inorganic particles, and then, after further addition of suitable binder, solvent, and plasticizer, the admixture is kneaded into a slurry. After that, the slurry is shaped into sheet form by a heretofore known technique such as the doctor blade method or the calender roll method to obtain a ceramic green sheet. The ceramic green sheet is subjected to a suitable punching process, and, on an as needed basis, a plurality of ceramic green sheets are stacked one upon another, followed by high-temperature firing (at about 1300 to 1600° C.), whereby the insulating substrate 2 is produced.

The insulating substrate 2 may include a crystal phase containing alumina and manganese, and a glass phase containing manganese. The crystal phase may contain, in addition to alumina, various ceramics such as mullite, zirconia, aluminum nitride, and glass ceramics.

The glass phase is an amorphous phase which contains at least $Mn_2O_3$, and may further contain one or more oxides selected from among Si, Mg, Ca, Sr, B, Nb, Cr, and Co. Also, the glass phase may be an amorphous phase containing $Mn_2O_3$, $SiO_2$, and MgO.

The glass phase containing manganese exhibits good wettability to an alumina crystal phase, and it is thus believed that the glass phase permeates a surface layer of the insulating substrate 2 so as to cover the surfaces of crystal particles in a heating process subsequent to the firing process, in consequence whereof there result many glass phases in the surface layer.

Thus, in the presence of such a glass phase containing manganese in an exposed state on the first face 2a of the insulating substrate 2, there is obtained a cracking-resistant insulating substrate 2 having little defect which becomes a starting point of crack propagation. Owing to the glass phase being lower in Young's modulus than the alumina-containing crystal phase, it is possible to mitigate thermal shock resulting from adhesion of water droplets to the insulating substrate 2 under contact with exhaust gas, for example, and thereby reduce occurrence of cracking.

The sensing electrodes 3a to 3d are via electrodes (that is, cylindrical electrodes). For example, the sensing electrodes 3a to 3d are each 50 μm in diameter, and, a distance between adjacent sensing electrodes is set at 10 μm. Note that the diameter of each of the sensing electrodes 3a to 3d may fall in the range of 20 μm to 100 μm, and the distance between adjacent sensing electrodes may fall in the range of 5 μm to 50 μm.

Owing to the sensing electrodes 3a to 3d being built as via electrodes, the insulating substrate 2 including the sensing electrodes 3a to 3d can be produced by a method similar to that adopted for the production of a conventional via electrode-equipped circuit board.

As described above, the sensing electrodes 3a to 3d are electrodes for detecting particulate matter such as soot in an environment where the sensor substrate is installed in the sensor device. Upon adhesion of particulate matter such as soot to between a pair of electrodes (for example, between the sensing electrodes 3a and 3b, or between the sensing electrodes 3c and 3d), the electrical resistance in between the pair of electrodes varies, causing a change in leakage current flowing between the electrodes. The detection of this leakage current change allows acquisition of information about particulate matter existing between the pair of electrodes.

Thus, the sensing electrodes 3a to 3d contain a metal material capable of detection of a change in leakage current. As such a metal material, platinum, which is resistant to oxidation, may be used for the sensing electrodes 3a to 3d.

Moreover, as the metal material used for the sensing electrodes 3a to 3d, it is possible to use a material which is highly resistant to oxidation under a high-temperature environment. For example, it is possible to use platinum or a metal material in which an oxide-containing passivation film is formed on a surface thereof. Examples of the metal material in which an oxide-containing passivation film is formed on a surface thereof include a Fe—Ni—Cr—Ti—Al alloy and $MoSi_2$ metal.

For example, the passivation film is set to a thickness of about 0.1 to 5 μm. The passivation film having this level of thickness covers the surface parts of the sensing electrodes 3a to 3d, thus reducing the possibility of oxidation of the whole or the most part of the sensing electrodes.

The sensing electrodes 3a to 3d may be configured so that about 90% in area of their surface parts comprises a passivation film. In other words, 90% or above of the exposed surfaces of the sensing electrodes 3a to 3d may be covered with a passivation film. This permits a reduction in the possibility of the progress of oxidation in the sensing electrodes 3a to 3d as a whole.

Moreover, the sensing electrodes 3a to 3d may be configured so that the whole of their surface parts comprises a passivation film. In other words, the entire area of the exposed surfaces of the sensing electrodes 3a to 3d may be covered with a passivation film. This permits a further reduction in the possibility of the progress of oxidation in the sensing electrodes 3a to 3d as a whole.

Moreover, the exposed surfaces of the sensing electrodes 3a to 3d and the electrode terminals 4a to 4d may be deposited with a metallic plating layer by electroplating or electroless plating. The metallic plating layer is formed of a metal which is highly resistant to corrosion and is highly connectable with a connecting member, such as nickel, copper, gold, or silver. For example, an about 0.5 to 10 μm-thick nickel plating layer and an about 0.1 to 3 μm-thick gold plating layer, or, an about 1 to 10 μm-thick nickel plating layer and an about 0.1 to 1 μm-thick silver plating layer, are deposited one after another. This makes it possible to suppress corrosion of the sensing electrodes 3a to 3d and the electrode terminals 4a to 4d, and also to strengthen the connection between each of the electrode terminals 4a to 4d and an external electric circuit, or the connection between each of the electrode terminals 4a to 4d and a metallic lead (not shown). Note that a metallic plating layer formed of a metal other than the above-described metal, for example, a palladium plating layer, may be interposed.

The innerlayer wiring lines 6a to 6d are formed within the insulating substrate 2 and are electrically connected, via the internal wiring lines 5a to 5d, to the electrode terminals 4a to 4d disposed on the first face 2a of the insulating substrate. The innerlayer wiring lines 6a to 6d are formed by utilizing different layers (the second layer or the third layer) to leave wiring space corresponding to the sensing electrodes 3a to 3d. The innerlayer wiring lines 6a to 6d may include, for example, a circuit-patterned wiring conductor (not marked with reference symbol) which is disposed as an interlayer between the insulating layers.

The heat-generating electrode 7 is formed of, for example, a metal material similar to that used for the sensing electrode 3a, etc., which may be, in the interest of efficient heat generation, a material containing iron, titanium, chromium, silicon, etc. having high electrical resistance. Moreover, the heat-generating electrode 7 may contain an oxidation-resistant metal, such as platinum or a Fe—Ni—Cr alloy, as a major constituent.

The metal material used for the heat-generating electrode 7 is contained in an amount of, for example, about 80% or above by mass in the heat-generating electrode 7 as a major constituent of the heat-generating electrode 7. The heat-generating electrode 7 may contain, in addition to the metal material, an inorganic component such as glass or ceramic. For example, the inorganic component is a component for adjustment of firing-induced contraction of the heat-generating electrode 7 when the heat-generating electrode 7 is formed by co-firing with the insulating substrate 2.

With respect to the sensing electrodes 3a to 3d, the electrode terminals 4a to 4d, the internal wiring lines 5a to 5d, the innerlayer wiring lines 6a to 6d, and the heat-generating electrode 7, for example, powder of the above-described metal materials is kneaded with an organic solvent and a binder to prepare a metallic paste, and, the metallic paste is applied, in a predetermined pattern, to the surface of the ceramic green sheet which constitutes the insulating substrate 2, or filled, in a predetermined pattern, in a through hole of the ceramic green sheet. The application or filling of the metallic paste is effected by a printing technique such for example as the screen printing method. Then, a plurality of ceramic green sheets are stacked one upon another to cover the printed patterns which define the sensing electrodes 3a to 3d, the electrode terminals 4a to 4d, the internal wiring lines 5a to 5d, the innerlayer wiring lines 6a to 6d, and the heat-generating electrode 7, followed by co-firing of the metallic pastes and the ceramic green sheets.

The following describes the operation of a sensor device according to the present embodiment including the sensor substrate 1a constructed as mentioned above.

Figure 3:
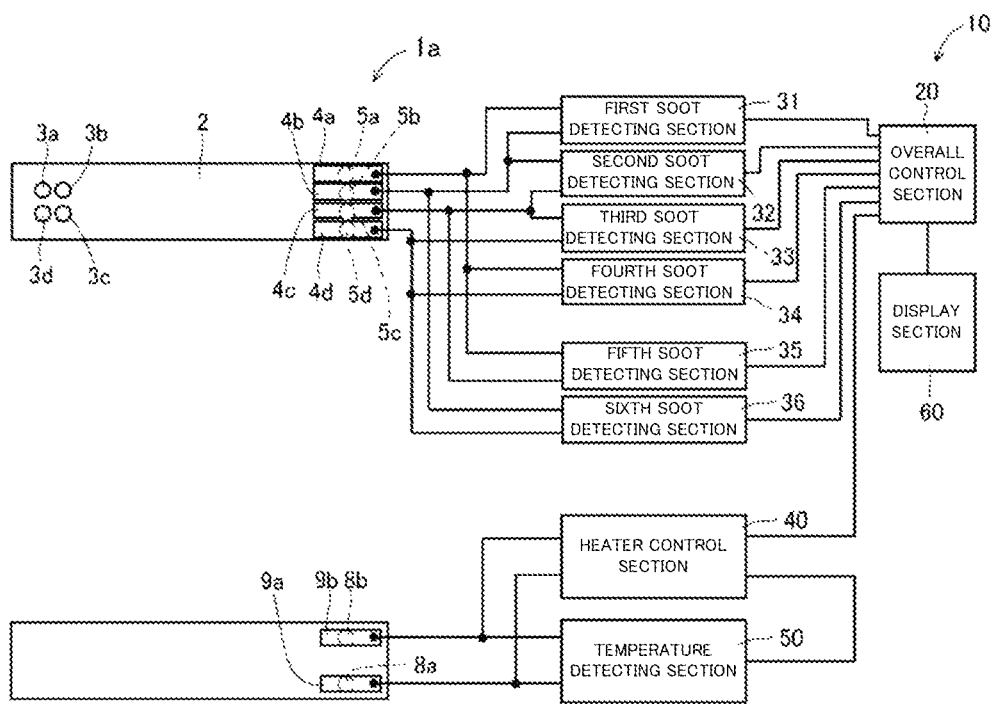
FIG. 3 is a block diagram showing the functional structure of the sensor device including the sensor substrate according to the first embodiment.

FIG. 3 is a block diagram showing the functional structure of the sensor device including the sensor substrate according to the first embodiment. As shown in FIG. 3, the sensor device 10 according to the present embodiment comprises the sensor substrate 1a, an overall control section 20, and first to sixth soot detecting sections 31 to 36, and may further comprise a heater control section 40, a temperature detecting section 50, and a display section 60.

The overall control section 20 is, for example, a microcomputer for exercising overall control of the sensor device 10. More specifically, the overall control section 20 performs control of the first to sixth soot detecting sections 31 to 36 and the heater control section 40 on the basis of predetermined programs. Moreover, the overall control section 20 determines the condition of distribution of particulate matter and the size of particulate matter on the basis of current values measured by the first to sixth soot detecting sections 31 to 36.

The first soot detecting section 31 applies a predetermined voltage (for example, 50 [V]) fed from an external DC power supply (not shown) between the sensing electrodes 3a and 3b on a command from the overall control section 20 to perform detection of particulate matter between such electrodes. More specifically, the first soot detecting section 31 performs measurement of a value of electric current flowing between the sensing electrodes 3a and 3b.

Like the first soot detecting section 31, the second soot detecting section 32 performs measurement of a value of electric current flowing between the sensing electrodes 3b and 3c on a command from the overall control section 20 to perform detection of particulate matter between the sensing electrodes 3b and 3c.

Similarly, the third detecting section 33, the fourth detecting section 34, the fifth detecting section 35, and the sixth detecting section 36 perform current value measurement to perform detection of particulate matter between the sensing electrodes 3c and 3d, between the sensing electrodes 3d and 3a, between the sensing electrodes 3a and 3c, and between the sensing electrodes 3b and 3d, respectively. In the case where the sensing electrode 3a and the sensing electrode 3c are each defined as a positive electrode, and the sensing electrode 3b and the sensing electrode 3d are each defined as a negative electrode, then the sensing electrodes corresponding to the fifth detecting section 35, as well as the sensing electrodes corresponding to the sixth detecting section 36, are identical in polarity, wherefore neither of the fifth detecting section 35 and the sixth detecting section 36 performs the above-described current value measurement.

The heater control section 40 includes a DC power supply set for, for example, 20 [V], and performs control for heating the heat-generating electrode 7 to a predetermined temperature on a command from the overall control section 20.

The temperature detecting section 50 includes a temperature sensor, and measures the temperature of the heat-generating electrode 7 on a command from the heater control section 40.

The display section 60 is, for example, a liquid crystal display which displays current values detected by the first to sixth soot detecting sections 31 to 36, the condition of distribution and the size of particulate matter, etc. on a command from the overall control section 20.

The following describes a method for determining the condition of distribution, the size, etc. of particulate matter adhering to the sensing electrodes 3a to 3d.

Figure 4:
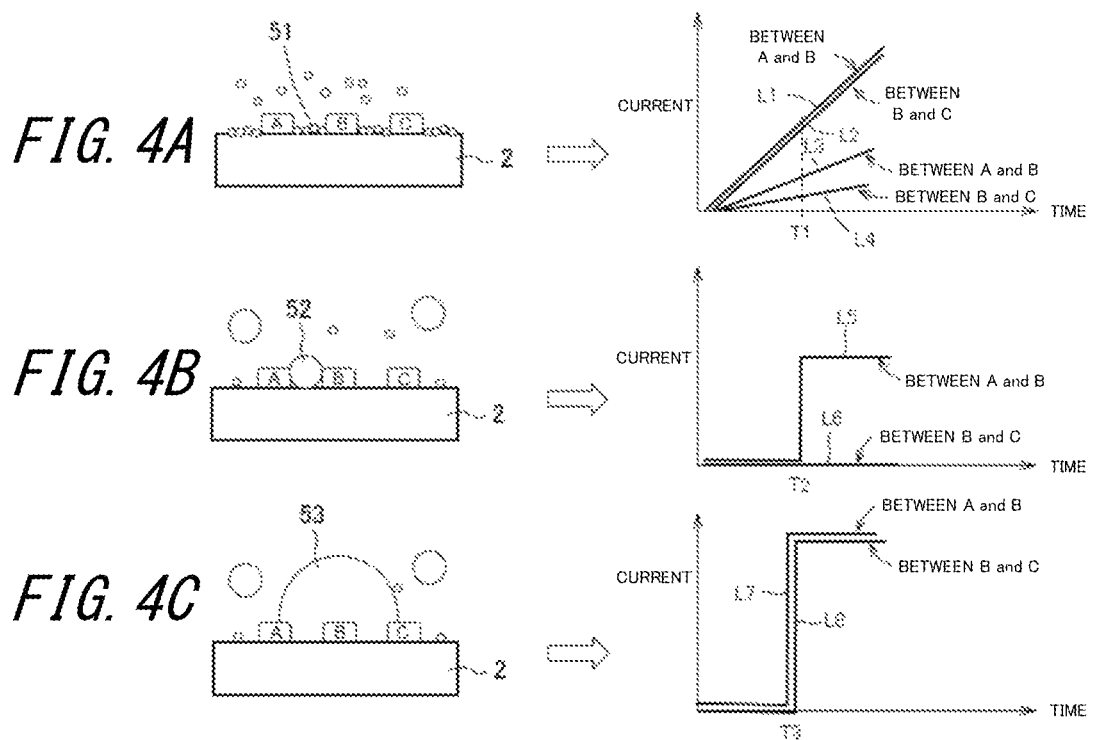
FIG. 4A is a schematic diagram for explaining how leakage current varies upon adhesion of minute soot to the sensor substrate.
FIG. 4B is a schematic diagram for explaining how leakage current varies upon adhesion of medium-sized soot to the sensor substrate.
FIG. 4C is a schematic diagram for explaining how leakage current varies upon adhesion of coarse soot to the sensor substrate.

FIGS. 4A to 4C are schematic diagrams for explaining how leakage current varies, depending on the size of soot adhering to the sensor substrate. FIG. 4A is a schematic diagram for explaining how leakage current varies upon adhesion of minute soot to the sensor substrate. FIG. 4B is a schematic diagram for explaining how leakage current varies upon adhesion of medium-sized soot to the sensor substrate. FIG. 4C is a schematic diagram for explaining how leakage current varies upon adhesion of coarse soot to the sensor substrate.

In FIG. 4A, there is shown a case where minute soot 51 has adhered to the sensor substrate. As indicated by the right-hand graph, at a point of time T1, leakage current flowing between electrodes A and B and leakage current flowing between electrodes B and C are on the increase substantially equally (Curve L1, Curve L2). When the leakage current between the electrodes A and B and the leakage current between the electrodes B and C increase at different increasing rates (Curve L3, Curve L4), then it is determined that the soot distribution in the electrode A-to-electrode B region and the soot distribution in the electrode B-to-electrode C region differ from each other (lack of uniformity in soot distribution).

In FIG. 4B, there is shown a case where medium-sized soot has adhered to the sensor substrate. As indicated by the right-hand graph, at a point of time T2, only the leakage current between the electrodes A and B is increasing sharply (Curve L5). In this case, it is determined that medium-sized soot has adhered to a region between the electrode A and the electrode B at the point of time T2.

In FIG. 4C, there is shown a case where coarse soot 53 has adhered to the sensor substrate. As indicated by the right-hand graph, at a point of time T3, both the leakage current between the electrodes A and B and the leakage current between the electrodes B and C are increasing sharply. In this case, it is determined that coarse soot has adhered to a region between the electrode A and the electrode B and a region between the electrode B and the electrode C at the point of time T3.

Figure 5:
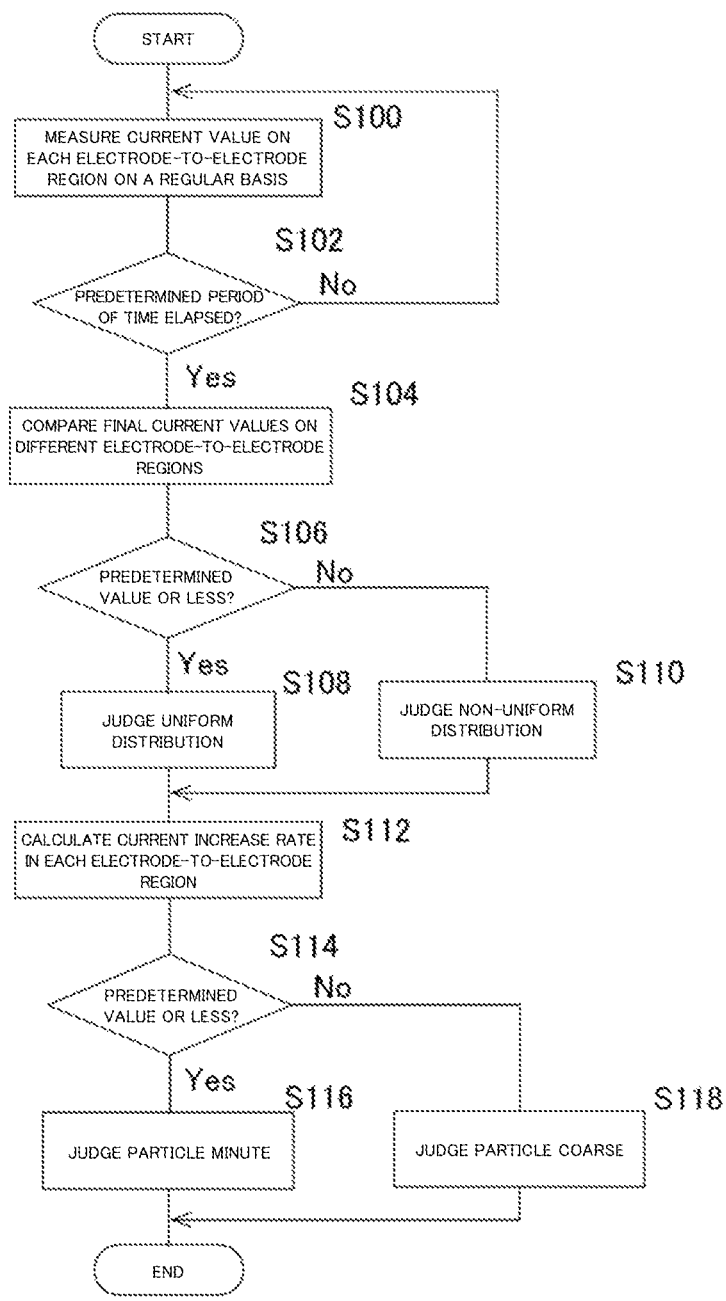
FIG. 5 is a flowchart showing an algorithm for determining the distribution and the size of detection targets in the sensor device according to the first embodiment.

FIG. 5 is a flowchart showing an algorithm for determination of the distribution and the size of detection targets in the sensor device according to the first embodiment.

To begin with, current value measurement is performed by the first to sixth soot detecting sections 31 to 36 on a regular basis on a command from the overall control section 20 (S100), and, after a lapse of a predetermined period of time ("YES" at S102), the overall control section 20 compares final current values on the respective electrode-to-electrode regions (S104).

When the result of the comparison showed that the final current value on each electrode-to-electrode region is less than a predetermined value ("Yes" at S106), then the overall control section 20 judges that soot distributions are uniform (S108).

On the other hand, when the result showed that the final current value on each electrode-to-electrode region is greater than the predetermined value ("No" at S106), then the overall control section 20 judges that soot distributions are not uniform (S110).

Next, the overall control section 20 calculates the rate of current increase in each electrode-to-electrode region (S112). When the calculated value is less than a predetermined value ("Yes" at S114), then the overall control section 20 judges that soot particle is minute (S116).

On the other hand, when the calculated value of current increase rate is greater than the predetermined value ("No" at S114), then the overall control section 20 judges that soot particle is coarse (S118).

Second Embodiment

Figure 6A:
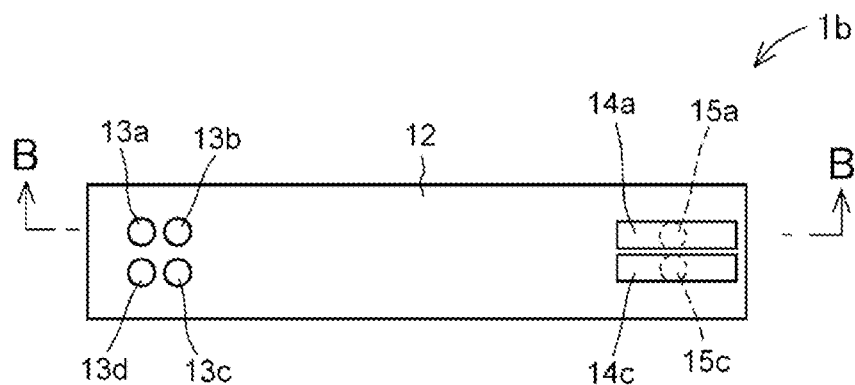
FIG. 6A is a top view of a sensor substrate according to the second embodiment.
Figure 6B:
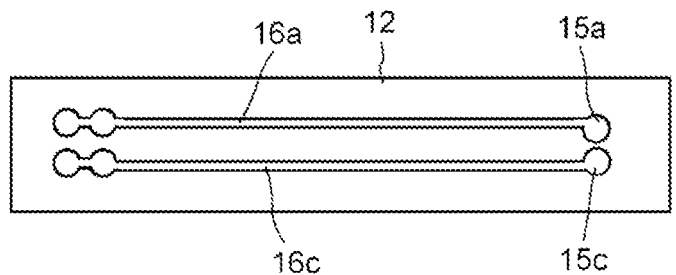
FIG. 6B is a view showing a wiring configuration in a second layer of the sensor substrate according to the second embodiment.
Figure 6C:
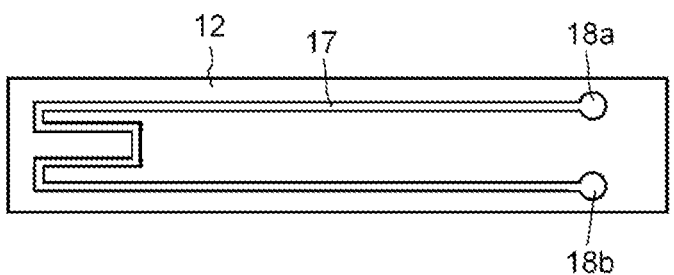
FIG. 6C is a view showing the configuration of a heat-generating electrode in a third layer of the sensor substrate according to the second embodiment.
Figure 6D:
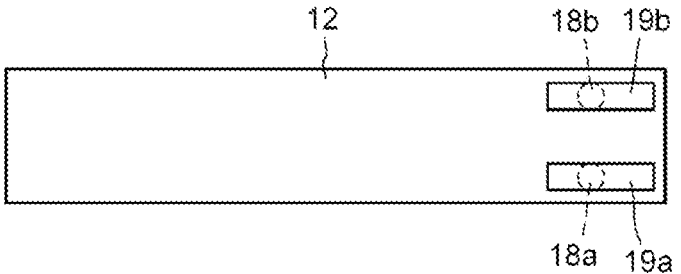
FIG. 6D is a backside view of the sensor substrate according to the second embodiment.
Figure 7:
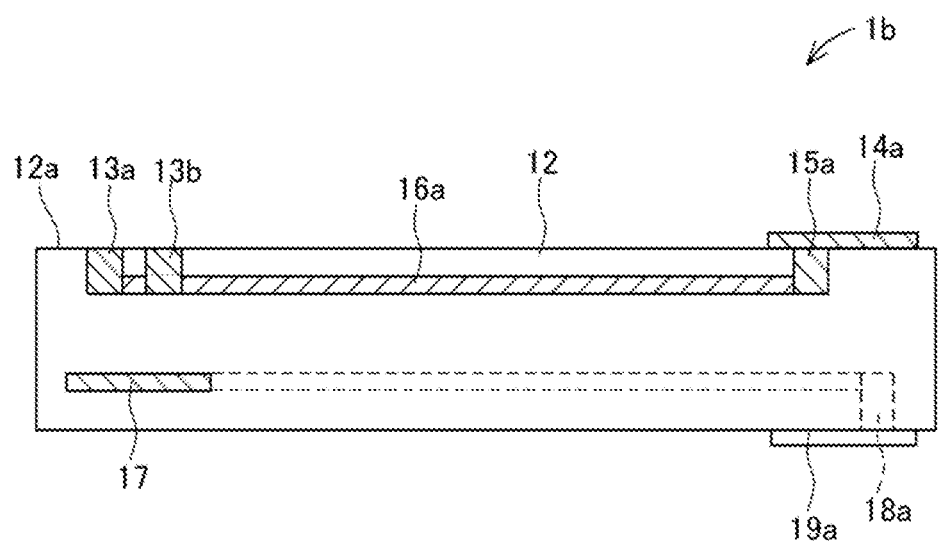
FIG. 7 is a sectional view taken along the line B-B of FIG. 6A.

FIGS. 6A to 6D are drawings showing a structural example of a multilayer-structured sensor substrate according to the second embodiment of the invention. FIG. 6A is a top view of a sensor substrate 1b, FIG. 6B is a view showing a wiring configuration in a second layer of the sensor substrate 1b, FIG. 6C is a view showing the configuration of a heat-generating electrode in a third layer of the sensor substrate 1b, and FIG. 6D is a backside view of the sensor substrate 1b. In addition, FIG. 7 is a sectional view taken along the line B-B of FIG. 6A.

The sensor substrate 1b provides features of constructional simplicity and low cost, while achieving the narrowing of a gap between the sensing electrodes, when installed in a sensor device.

As shown in FIGS. 6A to 6D and FIG. 7, electrode terminals 14a and 14c, internal wiring lines 15a and 15c, and innerlayer wiring lines 16a and 16c are disposed at or embedded within a first layer or the second layer of the sensor substrate 1b corresponding to sensing electrodes 13a and 13b and sensing electrodes 13c and 13d. Moreover, a heat-generating electrode 17 is embedded within the third layer of the sensor substrate 1b, and, internal wiring lines 18a and 18b and connection pads 19a and 19b are disposed at or embedded within the third layer or a fourth layer corresponding to the positive and negative sides of the heat-generating electrode 17.

For example, as is the case with the above-described first embodiment, the sensing electrodes 13a to 13d are each a cylindrical electrode, the upper surface of which is exposed from a first face 12a of an insulating substrate 12, and, each upper surface is flush with the first face 12a. Moreover, the sensing electrodes 13a and 13b are connected to the positive electrode of an external DC power supply (not shown) (for example, 50 [V]), whereas the sensing electrodes 13c and 13d are connected to the negative electrode of the DC power supply.

Thus, the sensing electrode 13a constitutes, in conjunction with the sensing electrode 13c, a pair of positive and negative sensing electrodes, and, the sensing electrode 13b constitutes, in conjunction with the sensing electrode 13d, a pair of positive and negative sensing electrodes. That is, owing to a plurality of pairs of the sensing electrodes in the above-described sensor substrate 1b having a common arrangement of positive and negative electrodes, a sensor device according to this embodiment (not shown) can be implemented by the application of the sensor device 10 according to the first embodiment (more specifically, only the first soot detecting section 31 is activated). The sensor device is operated in common with the sensor device 10, wherefore detailed description thereof will be omitted.

Modified Examples

Figure 8A:
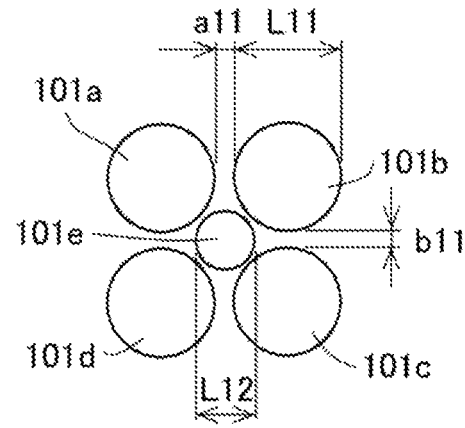
FIG. 8A shows an modified example in which circular sensing electrodes having different diameters are combined.
Figure 8B:
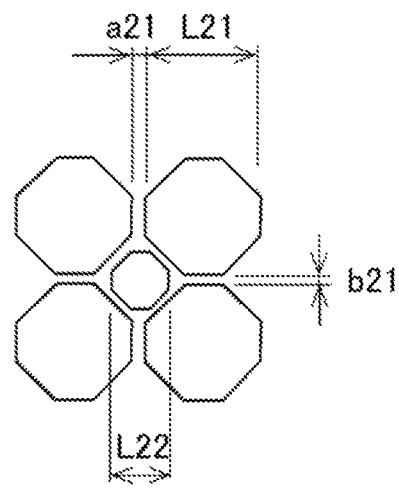
FIG. 8B shows a modified example of a case where the circular shape of the sensing electrode in FIG. 8(a) is changed to an octagonal shape.
Figure 8C:
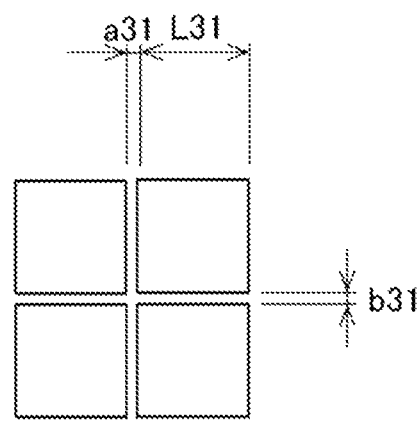
FIG. 8C shows a modified example of a case where the circular shape of the sensing electrode of the first embodiment is changed to a square shape.

The following describes modified examples in the sensing electrode of the first and second embodiments. FIGS. 8A to 8C are drawings showing modified examples in the sensing electrodes 3a to 3d or the sensing electrodes 13a to 13d in respect of their electrode shape and arrangement.

FIG. 8A shows a modified example in which circular sensing electrodes having different diameters are combined. In FIG. 8A, sensing electrodes 101a to 101d and a sensing electrode 101e, while being each circularly shaped as seen from above, differ in diameter from each other (L11 is set at 50 μm, L21 is set at 25 μm). The distance between the electrodes is set at 10 μm. In FIG. 8A, for example, in the case of applying voltage so that the sensing electrode 101e serves as a positive electrode and the sensing electrodes 101a to 101d serve as negative electrodes, four pairs of sensing electrodes are formed.

FIG. 8B shows a modified example of a case where the circular shape of the sensing electrode as shown in FIG. 8A has been changed to an octagonal shape. In FIG. 8B, as to the diameter of each electrode and the distance between the electrodes, for example, L12 is set at 50 μm, a12 is set at 10 μm, and b12 is set at 10 μm.

FIG. 8C shows a modified example of a case where the circular shape of the sensing electrode of the first embodiment has been changed to a square shape. In FIG. 8C, as to the size of each electrode and the distance between the electrodes, for example, L13 is set at 50 μm, a13 is set at 10 μm, and b13 is set at 10 μm.

The shape of the sensing electrode of the above-described embodiments is not limited to the above-described shape, but may be an elliptical shape or other polygonal shape. Moreover, the functions of the first to sixth soot detecting sections 31 to 36 of the first embodiment may be integrated into a single first soot detecting section, and, in this case, detection of particulate matter (for example, measurement of leakage current, etc.) between the sensing electrodes is effected by operating switches provided in this first soot detecting section for sequential connection changeover.

Third Embodiment

Figure 9:
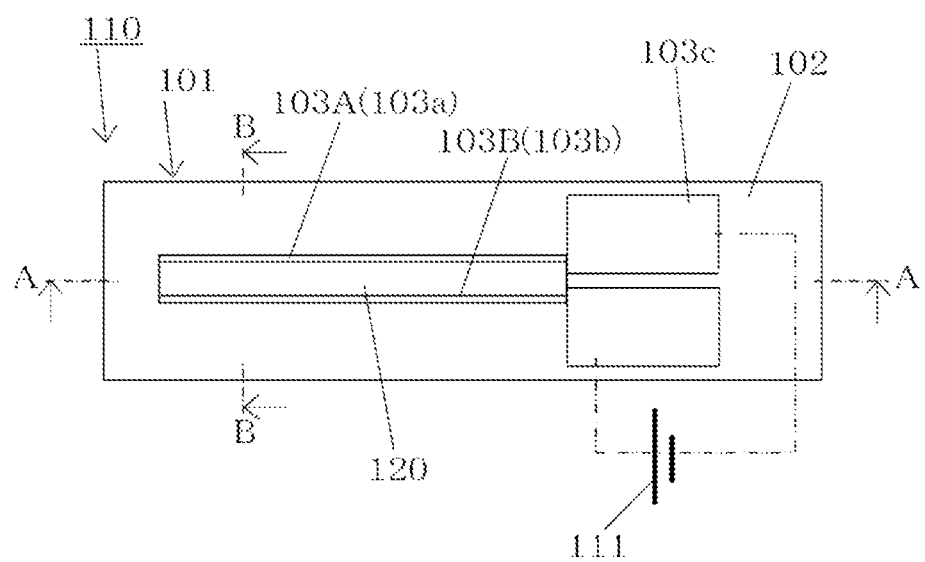
FIG. 9 is a plan view showing a sensor substrate and a sensor device according to a third embodiment of the invention.
Figure 10:
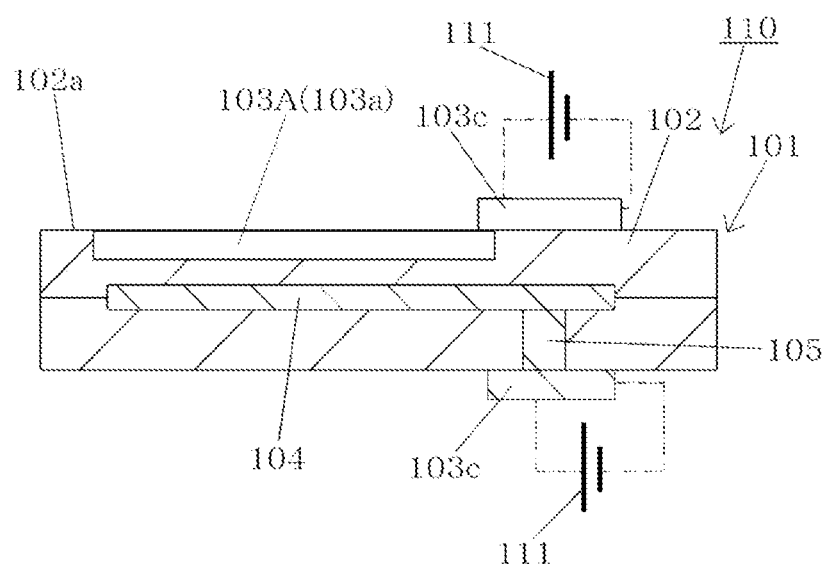
FIG. 10 is a sectional view taken along the line A-A of FIG. 9.
Figure 11:
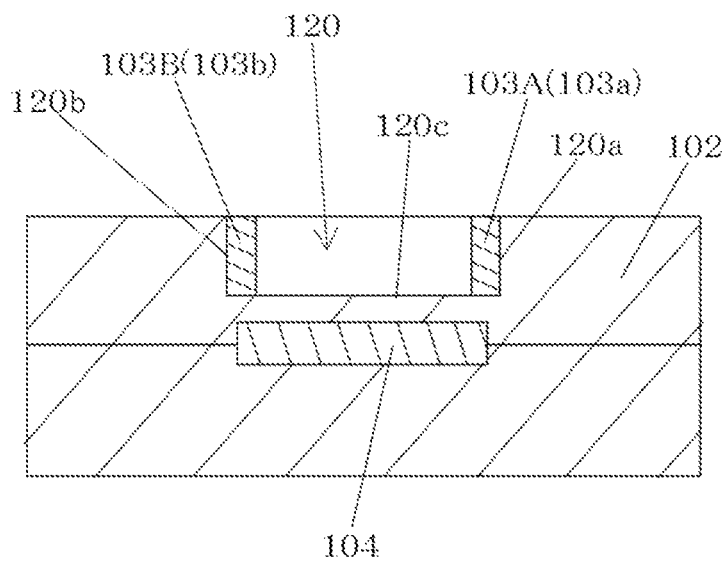
FIG. 11 is a sectional view taken along the line B-B of FIG. 9.

FIG. 9 is a plan view showing a sensor substrate and a sensor device according to the third embodiment of the invention, and, FIG. 10 is a sectional view taken along the line A-A of FIG. 9 and FIG. 11 is a sectional view taken along the line B-B of FIG. 9. A sensor substrate 101 comprises: an insulating substrate 102 having a principal face 102a provided with a groove 120; a pair of sensing electrodes 103A and 103B comprising a pair of opposed electrode portions 103a and 103b disposed on each side of the groove 120 at certain intervals so as to extend in the direction of elongation of the groove 120; and a heat-generating electrode 104 embedded within the insulating substrate 102.

The insulating substrate 102 has the form of, for example, a quadrangular flat plate, and serves as a base body portion for electrically insulating the pair of sensing electrodes 103A and 103B as well as the pair of sensing electrodes 103A and 103B and the heat-generating electrode 104 from each other.

For example, the insulating substrate 102 may be produced by a method similar to that adopted for the production of the insulating substrate 2 of the first embodiment. Like the above-described insulating substrate 2, the insulating substrate 102 may include a crystal phase containing alumina and manganese, and a glass phase containing manganese.

The presence of the manganese-containing glass phase in an exposed state on the principal face of the insulating substrate 102 can be determined by, for example, observation of photographs of the surface and section of the sensor substrate 101 under a scanning electron microscope (SEM), or analysis of the principal face of the sensor substrate 101 using X-ray photoelectron spectroscopy.

The insulating substrate 102 has the principal face 102a provided with the groove 120 within which the pair of sensing electrodes 103A and 103B are arranged so that the pair of sensing electrodes 103A and 103B face each other. In the following description, the pair of sensing electrodes 103A and 103B may also be referred to collectively as the sensing electrode 103.

For example, the groove 120 has a concave profile in a section perpendicular to the direction in which the groove extends (the direction of elongation), and is defined by one side face 120a and the other side face 120b opposed to each other, and a bottom face 120c. The pair of opposed electrode portions 103a and 103b constituting the pair of sensing electrodes 103A and 103B are disposed on the one side face 120a and the other side face 120b, respectively, of the groove 120. The groove 120 is configured so that the concave sectional profile is uniform throughout the groove 120 in the direction of elongation, and that the side faces 120a and 120b face each other at certain intervals in a width direction thereof, and, the pair of opposed electrode portions 103a and 103b disposed on the side faces 120a and 120b, each of which extends in the direction of elongation, are disposed at certain intervals in a width direction of the groove 120.

The pair of sensing electrodes 103A and 103B serve as sensing portions for measuring the content of fine particles such as soot in an environment where the sensor substrate 101 is placed. Accumulation of detection targets, viz., fine particles such as soot in between the pair of sensing electrodes 103A and 103B causes variation in electrical characteristics, for example, variation in resistance value or current value. The detection of the electrical characteristic variation allows the mass of fine particles in an environment where the sensing electrode 103 exists, to be calculated for detection. On the basis of the mass of the fine particles and the flow rate (volume) of a gas present in the environment where the sensing electrode 103 exists, the fine particle content in the gas is calculated for detection.

As used herein the environment where the sensor substrate 101 is placed refers to an exhaust passage for automotive exhaust gas, for example. As the amount of fine particles detected by the sensor substrate 101 increases, an increase in the content of fine particles flowing through the exhaust passage is detected. This makes it possible to detect failure in DPF (Diesel Particulate Filter) for removing fine particles such as soot from exhaust gas.

According to this embodiment, fine particles such as soot tend to accumulate inside the groove 120, and consequently, the pair of sensing electrodes 103A and 103B disposed on the inner surface of the groove 120 are prone to electrical characteristic variation due to the accumulated fine particles, thus enabling an increase in the detection accuracy of the sensor substrate 101.

The size, shape, etc. of the groove 120 provided in the insulating substrate 102 may be suitably determined depending on the environment where the sensor substrate 101 is placed. In this embodiment, as shown in FIG. 11, the transverse section of the groove 120, which is the section of the groove 120 perpendicular to the direction of elongation, is defined by a rectangle shaped so that the dimension in the groove width direction is greater than the dimension in the depth direction. The transverse section shape may be defined by a rectangle shaped so that the dimension in the depth direction is greater than the dimension in the groove width direction, or a square shaped so that the dimension in the depth direction and the dimension in the groove width direction are equal. Moreover, in this embodiment, the shapes of the groove 120 and the pair of sensing electrodes 103A and 103B are linear in a plan view thereof. As to the dimensions of the groove 120, for example, a depth thereof falls in the range of 10 to 150 microns, and a groove width falls in the range of 20 to 300 microns.

Each of the pair of opposed electrode portions 103a and 103b may be disposed so as to cover either the whole or part of corresponding one of the side faces 120a and 120b of the groove 120. When configuring the electrode portion to cover part of the side face, it is advisable to form the electrode portion so as to extend at least to ends of the side faces 120a and 120b on a side of the bottom face 120c for easiness in detection of fine particles such as soot accumulated on the bottom face 120c. Moreover, it is advisable to render the dimension in the depth direction and the dimension in the groove width direction of each of the pair of opposed electrode portions 103a and 103b uniform throughout the electrode portion in the direction of elongation for the prevention of local variations in electrical characteristics.

The pair of opposed electrode portions 103a and 103b are each configured so that the dimension in the depth direction thereof (the width as seen in side view) is equal to 10% to 100% of the depth of the groove 120, and the dimension in the groove width direction (the thickness as seen in side view) is equal to 5% to 30% of the groove width.

A metal material similar to that used for the above-described sensing electrodes 3a, etc. may be used for the sensing electrode 103. This allows similar advantageous effects to be attained.

It is noted that when a thickness of a passivation film of the sensing electrode 103 is too large, this leads to an increase in the initial resistance at the surface part of the sensing electrode 103 (the resistance in the sensing electrode yet to be set in a fine particle-bearing environment), which results in difficulties in detecting electrical characteristic variation caused in the sensing electrode 103 by adhesion of fine particles such as soot.

The sensing electrode 103 can be formed on the inner surface of the groove 120 of the insulating substrate 102 by applying a conductor paste prepared by admixing suitable organic binder, solvent, etc. in powder of platinum or a metal material in which an oxide-containing passivation film is formed on a surface thereof, in a predetermined pattern, to a recess which constitutes the groove 120 provided in a ceramic green sheet which constitutes the insulating substrate 102 by printing using a printing technique such as the screen printing method, and thereafter co-firing the conductor paste with a ceramic green sheet which constitutes the insulating substrate 102.

For example, a passivation film can be formed on the surface part of the sensing electrode 103 by performing the above-described firing process in an atmosphere bearing minute amounts of oxygen and moisture. During the firing process, a passivation film is developed on the exposed surface of the metal material containing a base metal material. In the alternative, after forming the sensing electrode 103 of the above-described metal material, the sensor substrate 101 including the sensing electrode 103 may be subjected to a heat treatment in an environment bearing minute amounts of oxygen and moisture. By the heat treatment, the exposed surface part of the metal material is oxidized for the development of a passivation film.

For example, in the case where the sensing electrode 103 is composed predominantly of an iron-nickel-chromium alloy, the passivation film has the form of an oxide layer containing at least one of iron oxide, chromium oxide, and chromium oxide. Owing to the presence of the passivation film on the surface part in this way, the progress of oxidation to the iron-nickel-chromium alloy in the sensing electrode 103 existing more inside than the passivation film is suppressed.

The metal material for forming the passivation film may be a metal material containing an iron-nickel-chromium alloy as a major constituent. That is, the base metal material may be the iron-nickel-chromium alloy. This is for the following reasons. That is, a passivation film containing such a base metal material is formed by oxidation of a metal material containing iron, nickel, and chromium. For that purpose, the metal material contained in the sensing electrode 103 is intended to contain iron, nickel, and chromium. For such a metal material, it is easy to form the sensing electrode 103 by co-firing with the insulating substrate 102 (ceramic green sheet) in the form of a metallic paste. Moreover, formation of the passivation film formation is easy and the progress of oxidation to the interior of the sensing electrode 103 is further suppressed. In addition, such a base metal is a catalytically inactive metal which lacks catalytic action.

Thus, in light of easiness in passivation film formation, that is, measurement accuracy, reliability, productivity, etc. to be fulfilled by the sensor substrate 101, the metal material for forming the sensing electrode 103 may be an alloy material composed predominantly of iron, nickel, and chromium.

The metal material containing an iron-nickel-chromium alloy which is a base metal material as a major constituent has a specific composition of, for example, 1 to 55% by mass of iron (Fe), 20 to 80% by mass of nickel (Ni), 10 to 25% by mass of chromium (Cr), 0.1 to 5% by mass of titanium (Ti), and 0.1 to 5% by mass of aluminum (Al).

Moreover, the base metal material used as a major constituent of the passivation film-forming metal material may contain iron and chromium. Also in this case, a passivation film containing such a base metal material is formed by oxidation of a metal material containing iron and chromium, and hence the metal material contained in the sensing electrode 103 is intended to contain iron and chromium. Also for this metal material, it is easy to form the sensing electrode 103 by co-firing with the insulating substrate 102 in the form of a metallic paste. Moreover, passivation film formation is easy and the progress of oxidation to the interior of the sensing electrode 103 is further suppressed. In addition, such a base metal is a catalytically inactive metal which lacks catalytic action.

Thus, in light of easiness in passivation film formation, that is, measurement accuracy, reliability, productivity, etc. to be fulfilled by the sensor substrate 101, the metal material for forming the sensing electrode 103 may be an alloy material composed predominantly of iron and chromium. Note that the iron-chromium alloy may be regarded as the above-described iron-nickel-chromium alloy with the nickel component removed. The iron-chromium alloy is easer in passivation than the iron-nickel-chromium alloy, and hence passivation film formation on the surface part of the sensing electrode 103 is easer.

It is sufficient that the passivation film is formed on a surface part of the sensing electrode 103 which is exposed to an external environment such as outside air. A surface part of the sensing electrode 103 which makes contact with the insulating substrate 102 does not necessarily have to be provided with the passivation film.

Moreover, in the absence of the passivation film on the surface part of the sensing electrode 103 which makes contact with a wiring conductor such as a connection pad 103*c*, the contact resistance between the sensing electrode 103 and the wiring conductor can be minimized with ease. In this case, it is possible to obtain the wiring conductor having a structure advantageous for enhancing electrical characteristics of the sensor substrate 101.

For example, the passivation film can be detected by cutting the sensor substrate 101 at a part thereof where the sensing electrode 103 is provided so that the sensor substrate can be seen in a longitudinal section view thereof and analyzing the surface part of the sensing electrode 103 by electron probe X-ray microanalysis (EPMA) or X-ray diffraction analysis. Moreover, the thickness of the passivation film can be measured in the same manner.

Thus, by using a metal material in which an oxide-containing passivation film is formed on a surface thereof as the material for forming the sensing electrode 103, it is possible to attain high oxidation resistance in a high-temperature environment by virtue of a passivation film on the surface even if an oxidation-resistant metal such as platinum is not used, and thereby provide the sensor substrate 101 having greater sensing accuracy and higher long-term reliability.

Moreover, the sensor substrate 101 may be produced by using a mold provided with a concavo-convex shape by surface cutting process or otherwise.

First, an electrically conductive paste corresponding to the pair of opposed electrode portions 103*a* and 103*b* is printed on a ceramic green sheet by the heretofore known screen printing method. Next, on an as needed basis, a plurality of ceramic green sheets are stacked one upon another to form a laminate body, and, a mold having a projection which conforms to the shape of the groove 120 is pressed against the laminate body under heat to induce deformation. At this time, a portion of the ceramic green sheet corresponding to the groove 120 is dented, and the printed conductive paste is set in a portion corresponding to each of the side faces 120*a* and 120*b* of the groove 120. Then, the laminate body shaped by the mold is fired, whereupon the sensor substrate 101 is produced.

The heat-generating electrode 104 is embedded within the insulating substrate 102 so as to lie in a position corresponding to the sensing electrode 103, for example, a position overlapping with at least part of the sensing electrode 103 in a transparent plan view thereof. The heat-generating electrode 104 is caused to generate heat under voltage application for decomposition of fine particles such as soot adhering to the sensing electrode 103.

The heat-generating electrode 104 is formed of, for example, a metal material similar to that used for the sensing electrode 103, which may be, in the interest of efficient heat generation, a material containing iron, titanium, chromium, silicon, etc. having high electrical resistance. Moreover, the heat-generating electrode 104 may contain an oxidation-resistant metal, such as platinum or a Fe—Ni—Cr alloy, as a major constituent.

The metal material used for the heat-generating electrode 104 is contained in an amount of, for example, about 80% or above by mass in the heat-generating electrode 104 as a major constituent of the heat-generating electrode 104. The heat-generating electrode 104 may contain, in addition to the metal material, an inorganic component such as glass or ceramic. For example, the inorganic component is a component for adjustment of firing-induced contraction of the heat-generating electrode 104 when the heat-generating electrode 104 is formed by co-firing with the insulating substrate 102.

For example, the heat-generating electrode 104 is formed similarly to the sensing electrode 103. That is, powder of the above-described metal material used for the heat-generating electrode 104 is kneaded with an organic solvent and a binder to prepare a metallic paste, and, the metallic paste is applied, in a predetermined pattern, to the surface of the ceramic green sheet which constitutes the insulating substrate 102. The application of the metallic paste is effected by a printing technique such for example as the screen printing method. After that, a plurality of ceramic green sheets are stacked one upon another to cover the printed pattern which defines the heat-generating electrode 104, followed by co-firing of the metallic paste and the ceramic green sheets.

In the sensor substrate 101 according to this embodiment, the upper surface of the insulating substrate 102 is provided with a connection pad 103c for external connection. The connection pad 103c is directly connected to, for example, one end of the sensing electrode 103. The connection pad 103c serves to establish electrical connection between the sensing electrode 103 and an external electric circuit (not shown). With the connection pad 103c joined to the external electric circuit via an electrically conductive joining material such as solder or a conductive adhesive, the sensing electrode 103 and the external electric circuit are electrically connected to each other through the connection pad 103c. As will hereafter be described, the connection pad 103c is disposed also on the lower surface of the insulating substrate 102, and, the heat-generating electrode 104 is electrically connected to the external electric circuit through the connection pad 103c.

Moreover, the surfaces of the sensing electrode 103 and the connection pad 103c may be deposited with a metallic plating layer by electroplating or electroless plating. The metallic plating layer is formed of a metal which is highly resistant to corrosion and is highly connectable with a connecting member, such as nickel, copper, gold, or silver. For example, a nickel plating layer having a thickness of about 0.5 to 10 μm and a gold plating layer having a thickness of about 0.1 to 3 μm, or, a nickel plating layer having a thickness of about 1 to 10 μm and a silver plating layer having a thickness of about 0.1 to 1 μm, are deposited one after another. This makes it possible to suppress corrosion of the sensing electrode 103 and the connection pad 103c, and to strengthen the connection between the connection pad 103c and the external electric circuit, or the connection between the connection pad 103c and a metallic lead.

Moreover, a metallic plating layer made of a metal other than the aforenamed metal, for example, a palladium plating layer, may be additionally interposed.

Moreover, there is provided an internal wiring line 105 for electrically connecting the heat-generating electrode 104 embedded within the insulating substrate 102 and the connection pad 103c disposed on the lower surface of the insulating substrate 102. The internal wiring line 105 may include a through conductor passing through at least part of the insulating substrate 102 in the thickness direction. Moreover, in the case where the insulating substrate 102 has the form of a laminate body comprising a stack of a plurality of insulating layers, the internal wiring line 105 may include, for example, a wiring conductor having a circuit pattern or the like, the wiring conductor being disposed in an interlayer between the insulating layers.

The thereby constructed sensor substrate 101 and a power supply section 111 for the supply of potential to the sensing electrode 103 constitute a sensor device 110 according to an embodiment. In the sensor device 110, a potential of about 50 volts (V) is supplied from the power supply section 111 to the sensing electrode 103 by the power supply section 111, and leakage current due to this potential is detected. On the basis of the value of the leakage current, the resistance value of the sensing electrode 103 is detected. For example, the resistance value of the sensing electrode 103 is measured by an external measurement-detection circuit (not shown). Moreover, a circuit for measurement of the resistance value of the sensing electrode 103 (not shown) may be disposed on the insulating substrate 102.

The power supply section 111, in the form of a soot detection circuit for example, comprises a terminal, a rectifier, a transformer circuit, etc., electrically connected to an external power supply (not shown), to which predetermined electric power is transmitted from an external power supply. In the power supply section 111, the power transmitted is adjusted to suit for measurement of the resistance value of the sensing electrode 103, and is applied to the sensing electrode 103.

The power supply section 111 and the sensing electrode 103 are electrically connected to each other via the above-described connection pad 103c, for example. In FIGS. 9 and 10, a conductor for connection, such as a conductive connecting member, used to provide electrical connection between the connection pad 103c and the power supply section 111 is schematically shown by a virtual line (chain double-dashed line).

Since the sensor device 110 according to the above-described embodiment comprises the sensor substrate 101 of the above-described construction, a sensor device having high detection accuracy can be realized.

Figure 12A:
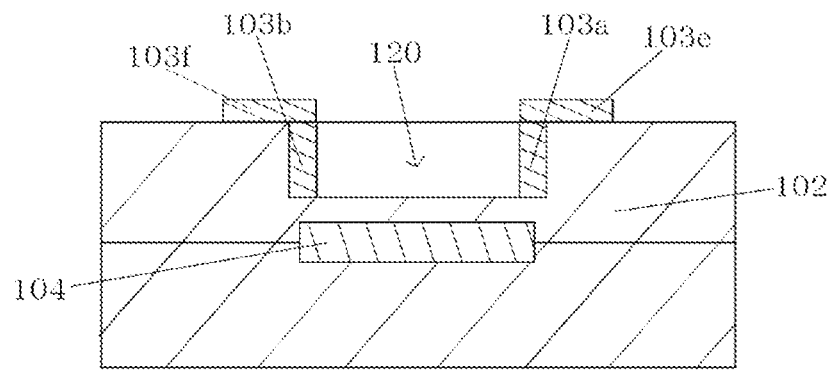
FIGS. 12A to 12C are sectional views showing another embodiment of the invention.
Figure 12B:
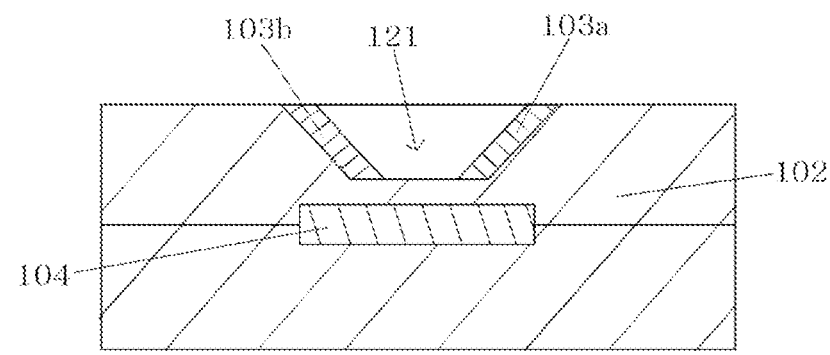
Figure 12C:
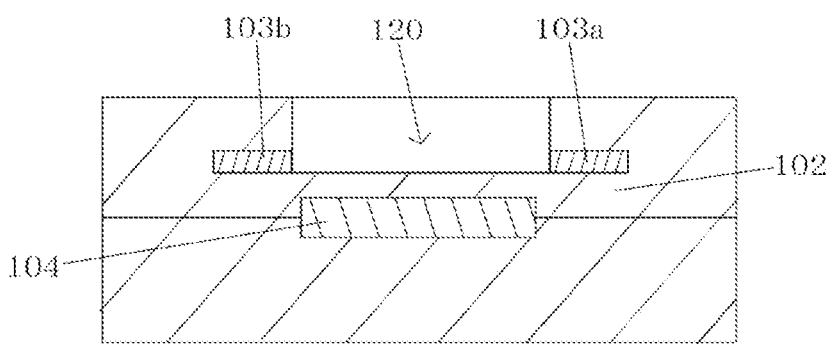

FIGS. 12A to 12C are sectional views showing another embodiment of the invention. Each sectional view corresponds to a sectional view taken along the line B-B of FIG. 9, like FIG. 11. Each embodiment shown in FIGS. 12A to 12C is basically the same as the above-described embodiment shown in FIGS. 9 to 11, except for the shapes of the sensing electrode 103 and the groove 120, etc., wherefore, only the sections of these embodiments being shown, such constituent components as are common to those of the preceding embodiment will be identified with the same reference symbols, and the descriptions therefor will be omitted.

In the embodiment shown in FIG. 12A, a pair of the sensing electrodes 103A and 103B comprises, in addition to the above-described pair of opposed electrode portions 103a and 103b, a pair of surface electrode portions 103e and 103f located on the principal face 102a of the insulating substrate 102. The pair of surface electrode portions 103e and 103f, while extending continuously from the pair of opposed electrode portions 103a and 103b, respectively, are disposed on one edge part of the principal face 102a of the insulating substrate 102 that is continuous with the one side face 120a of the groove 120 and the other edge part thereof that is continuous with the other side face 120b of the groove 120, respectively. That is, in this embodiment, the pair of sensing electrodes 103A and 103B is composed of the pair of opposed electrode portions 103a and 103b and the pair of surface electrode portions 103e and 103f.

In this embodiment, with the arrangement of the pair of surface electrode portions 103e and 103f, even in the presence of large soot whose diameter is greater than the groove width, the surface electrode is brought into contact with such a soot, thus enabling soot detection.

In the embodiment shown in FIG. 12B, the shape of a groove 121 differs from the shape of the groove 120 of the preceding embodiment, and the shape of the groove 121 is formed so that the opening width is larger than the bottom width. That is, the transverse section of the groove 121 is defined by an inverted trapezoid, wherefore the opposite side faces of the groove 121 are inclined away from each other in a direction from the bottom to the opening. The pair of opposed electrode portions 103a and 103b are each disposed on such an inclined side face.

In this embodiment, the large opening width facilitates entry of fine particles such as soot into the groove 121, and the small bottom width facilitates accumulation of fine particles such as soot on the bottom face, thus enabling a further increase in the detection sensitivity.

In the embodiment shown in FIG. 12C, the pair of opposed electrode portions 103a and 103b are each embedded in part within the insulating substrate 102, whereas the other part thereof is exposed. The exposed part is a part of the electrode portion which extends to the bottom-side end of corresponding one of the one side face 120a and the other side face 120b.

The positioning of the exposed part at the bottom-side end facilitates detection of fine particles such as soot accumulated on the bottom face of the groove 120. Owing to the embedded part being free from exposure to outside air and exhaust gas, variation in the electrical characteristics of the sensing electrode can be reduced.

Figure 13:
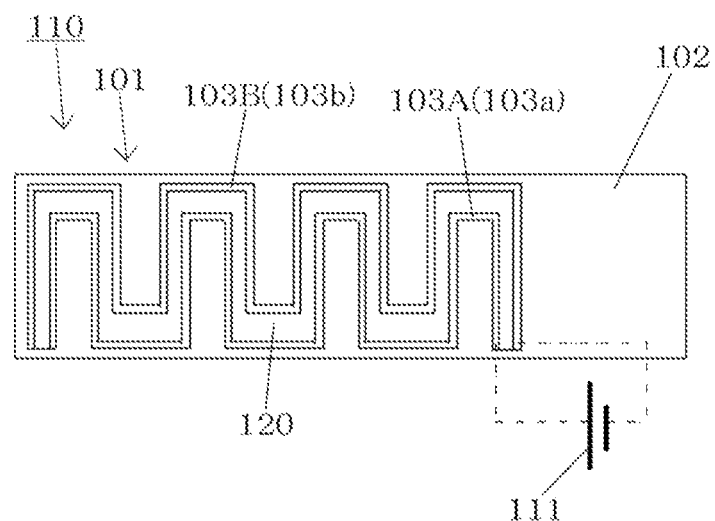
FIG. 13 is a plan view showing a sensor substrate and a sensor device according to still another embodiment of the invention.

FIG. 13 is a plan view showing a sensor substrate and a sensor device according to still another embodiment of the invention. In this embodiment, the groove 120 and the pair of opposed electrode portions 103a and 103b each disposed on corresponding one of the side faces of the groove 120 have, in contrast to those having a linear configuration of the preceding embodiment, a meandering configuration. This makes it possible to increase the length of the sensing electrode 103 while minimizing the size of the insulating substrate 102, as seen in a plan view thereof, for example. The longer the length of the sensing electrode 103 is, the greater the change of the resistance value of the sensing electrode 103 in the presence of fine particles such as soot is. That is, even if fine particles are present only in small amounts in the environment where the sensor substrate 101 is placed, the detection of the fine particles can be assured more positively.

Hence, this embodiment succeeds in providing the sensor substrate 101 and the sensor device 110 having the advantage to increase the detection accuracy and sensitivity of fine particles such as soot in the environment where the sensor substrate 101 is placed, and also the advantage of compact size in a plan view thereof.

Figure 14:
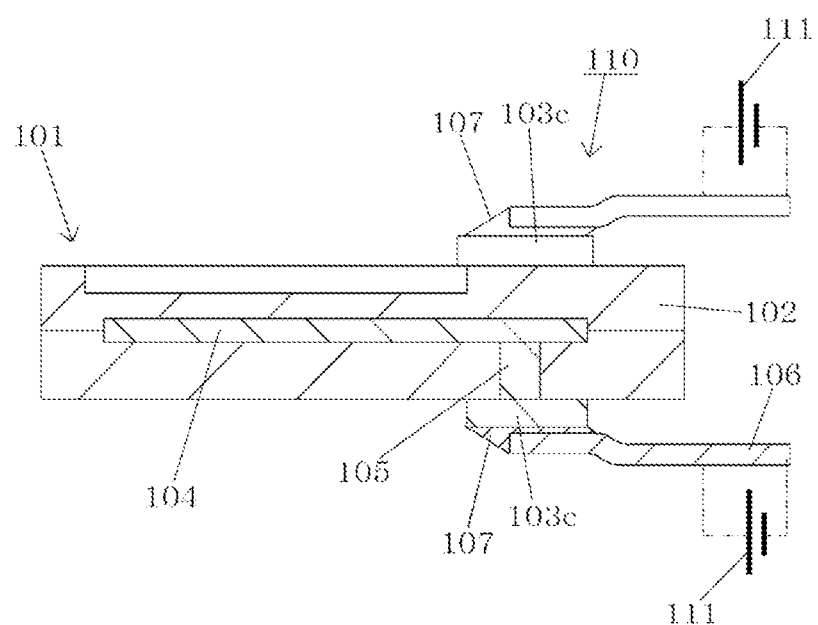
FIG. 14 is a sectional view showing the sensor substrate and the sensor device equipped with a lead terminal.

FIG. 14 is a sectional view showing the sensor substrate and the sensor device equipped with a lead terminal. In FIG. 14, such constituent components as are common to those shown in FIG. 9 will be identified with the same reference symbols, and the descriptions therefor will be omitted.

In the exemplification shown in FIG. 14, a lead terminal 106 is joined to the connection pad 103c. In this case, an end of the lead terminal 106 opposite from the end thereof joined to the connection pad 103c is joined to a predetermined location of an external electric circuit, thus providing electrical connection between the connection pad 103c and the external electric circuit. That is, the sensor substrate 101 (sensor device 110) is electrically and mechanically connected to the external electric circuit via the lead terminal 106. Various electrodes of the power supply section 111 (such as positive and negative electrodes) are each connected to corresponding one of different lead terminals 106. With the mechanical connection between the sensor substrate 101 and the external electric circuit via the lead terminal 106, occurrence of elastic deformation in the lead terminal 106 facilitates relaxation of a stress such as a thermal stress resulting from the difference in thermal expansion between the insulating substrate 102 of the sensor substrate 101 and an external substrate such as a resin substrate (not shown) provided with the external electric circuit. Hence, in this case, it is possible to provide the sensor substrate 101 and the sensor device 110 having the advantage to achieve improvement in external connection reliability, for example.

Like the connection pad 103c, the lead terminal 106 is not intended for detection of fine particles. Hence, the material for forming the lead terminal 106 is suitably selected in conformity with usage environment and the conditions, such as productivity and economy, to be fulfilled by the sensor substrate 101. For example, forming the lead terminal 106 from a highly oxidation-resistant metal material such as platinum or gold confers an advantage in reliability on the sensor device 110. Moreover, in the capital interest of economy, etc., the lead terminal 106 may be formed of an iron-based alloy such as an iron-nickel-cobalt alloy, or copper or the like. In the case of forming the lead terminal 106 of the iron-based alloy, the exposed surface of the lead terminal 106 may be protected by a plating layer such as a gold plating layer.

For example, joining of the lead terminal 106 to the connection pad 103c is performed by a brazing material (not marked with reference symbol) such as silver solder (silver-copper solder) or gold solder. As is the case with the lead terminal 106, selection of the brazing filler material is suitably made in conformity with various conditions set for the manufacture or usage of the sensor substrate 101.

It should be understood that the application of the invention is not limited to the embodiments thus far described, and hence, for example, the insulating substrate 102 may be provided with a plurality of sensing electrodes 103.

Fourth Embodiment

Figure 15A:
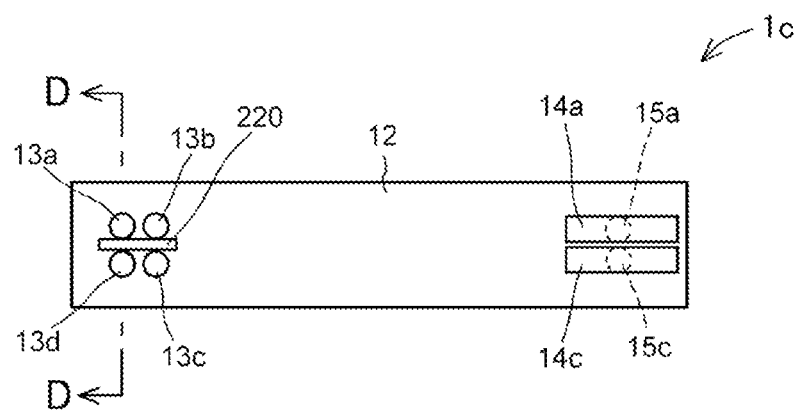
FIG. 15A is a top view of a sensor substrate according to a fourth embodiment.
Figure 15B:
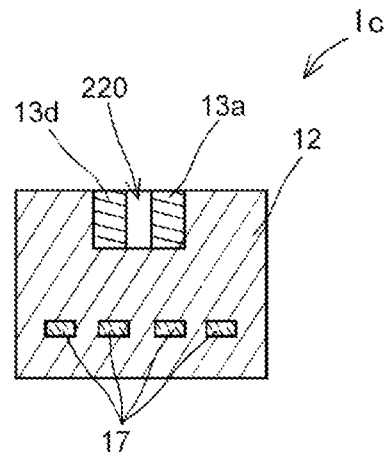
FIG. 15B is a sectional view taken along the line D-D of FIG. 15A.

FIGS. 15A and 15B are drawings showing a structural example of a multilayer-structured sensor substrate according to the fourth embodiment of the invention. FIG. 15A is a top view of a sensor substrate 1c, and FIG. 15B is a sectional view taken along the line D-D of FIG. 15A. The sensor substrate 1c shown in FIGS. 15A and 15B is basically the same as the earlier described sensor substrate 1b shown in FIGS. 6A to 6D and 7, except for the presence of a groove 220, wherefore such constituent components as are common to those of the sensor substrate 1b will be identified with the same reference symbols, and the descriptions therefor will be omitted.

The sensor substrate 1c achieves, as a feature thereof, a further increase in the detection sensitivity by the arrangement of the groove 220 for accumulation of fine particles such as soot therein.

More specifically, as is the case with the above-described second embodiment, the sensing electrodes 13a and 13b are connected to the positive electrode of an external DC power supply (for example, 50 [V]) (not shown), whereas the sensing electrodes 13c and 13d are connected to the negative electrode of the DC power supply. Moreover, the groove 220 is formed in a part of the insulating substrate 12 which lies between the sensing electrodes 13a and 13b and the sensing electrodes 13c and 13d. For example, the groove 220 is defined by a rectangle having dimensions of 50 μm by 10 mm as seen from the top, and is set for a depth of 150 μm.

In the sensor substrate 1c according to this embodiment, accumulation of fine particles such as soot inside the groove 220 allows a pair of the sensing electrodes 13a and 13d, as well as a pair of the sensing electrodes 13b and 13c, disposed on each side of the groove 220 to readily detect electrical characteristic variation resulting from fine particle accumulation, thus enabling a further increase in the detection sensitivity in the sensor substrate 1c.

Rather than being configured as shown in FIGS. 15A and 15B, the sensing electrode and the groove of the sensor substrate according to this embodiment may be configured similarly to the sensing electrode and the groove in the above-described third embodiment as shown in FIGS. 12A to 12C.

For example, like the above-described surface electrode portions 103e and 103f made continuous with the pair of opposed electrode portions 103a and 103b, respectively, as shown in FIG. 12A, the sensing electrode 13a or 13b, as well as the sensing electrode 13d or 13c, is partly projected upwardly from the upper surface of the insulating substrate 12, and further extends in a direction away from the groove 220 (or such an extending sensing electrode portion may be additionally provided). In this case, even in the presence of a fine particle such as soot whose diameter is greater than the groove width, the sensing electrode is brought into contact with the soot, thus enabling a further increase in the detection sensitivity.

Like the pair of opposed electrode portions 103a and 103b as shown in FIG. 12B, an opening width of the groove 220 can be formed so as to made larger than the bottom width. That is, the transverse section of the groove 220 is defined by an inverted trapezoid, wherefore the opposite side faces of the groove 220 are inclined away from each other in a direction from the bottom to the opening, and part of each of the pair of sensing electrodes 13a and 13d is formed along such an inclined side face, with its shoulder portion omitted. Thus, when the opening width of the groove 220 is larger than the bottom width, it is possible to facilitate entry of fine particles such as soot into the groove 220, as well as to facilitate accumulation of fine particles such as soot on the bottom face of narrower bottom width, and thereby increase the detection sensitivity even further.

Furthermore, like the pair of opposed electrode portions 103a and 103b as shown in FIG. 12C, the sensing electrodes 13a and 13d may be embedded in part within the insulating substrate 12, whereas the other part thereof is exposed to the groove 220. In this case, the exposed part is a part of the sensing electrode which extends to the bottom-side end of the groove 220. Thus, the positioning of the exposed part at the bottom-side end facilitates detection of fine particles such as soot accumulated on the bottom face of the groove 220, and also, owing to the embedded part of the sensing electrode 13b, 13c being free from exposure to outside air and exhaust gas, variation in the electrical characteristics of the sensing electrode can be reduced.

Fifth Embodiment

Figure 16A:
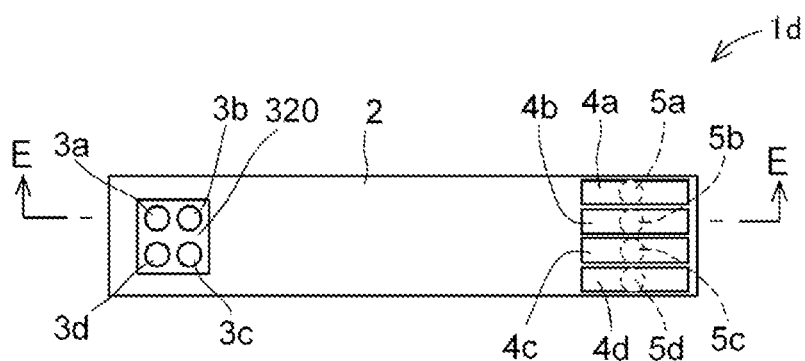
FIG. 16A is a top view of a sensor substrate according to a fifth embodiment.
Figure 16B:
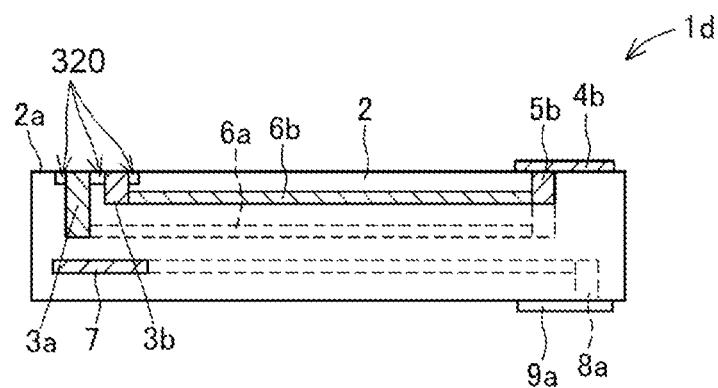
FIG. 16B is a sectional view taken along the line E-E of FIG. 16A.

FIGS. 16A and 16B are drawings showing a structural example of a multilayer-structured sensor substrate according to the fifth embodiment of the invention. FIG. 16A is a top view of a sensor substrate 1d, and FIG. 16B is a sectional view taken along the line E-E of FIG. 16A. The embodiment shown in FIGS. 16A and 16B is basically the same as the earlier described sensor substrate 1a shown in FIGS. 1A to 1E and 2, except for the presence of a groove 320, wherefore such constituent components as are common to those of the sensor substrate 1a will be identified with the same reference symbols, and the descriptions therefor will be omitted.

The sensor substrate 1d achieves, as a feature thereof, a further increase in the detection sensitivity by the arrangement of the groove 320 at the outer periphery of the sensing electrodes 3a to 3d for accumulation of fine particles such as soot in the groove 320.

More specifically, as is the case with the above-described first embodiment, the sensing electrodes 3a and 3c are connected to the positive electrode of an external DC power supply (for example 50 [V]) (not shown), whereas the sensing electrodes 3b and 3d are connected to the negative electrode of the DC power supply. Moreover, the groove 320 is formed in a part of the insulating substrate 2 which lies at the outer periphery of the sensing electrodes 3a to 3d. For example, the groove 320 is defined by a rectangle having dimensions of 4 mm by 10 mm as seen from the top, and is set for a depth of 150 μm.

In the sensor substrate according to this embodiment, fine particles such as soot accumulate inside the groove 320, and, consequently, the pair of sensing electrodes 3a and 3d, the pair of sensing electrodes 3a and 3b, the pair of sensing electrodes 3c and 3b, and the pair of sensing electrodes 3c and 3d disposed on the inner surface of the groove 320 are each prone to electrical characteristic variation due to the accumulated fine particles, thus enabling a further increase in the detection accuracy of the sensor substrate 1d. Note that the groove of this embodiment may be made smaller than the groove 320 as shown in FIGS. 16A and 16B so that the inner side of the groove and the outer sides of the sensing electrodes 3a to 3d are kept in contact with each other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST 1a, 1b, 1c, 1d, 101: Sensor substrate
2, 12, 102: Insulating substrate
2a, 12a: First face
3a, 3b, 3c, 3d, 13a, 13b, 13c, 13d: Sensing electrode
4a, 4b, 4c, 4d, 14a, 14b, 14c, 14d: Electrode terminal
5a, 5b, 5c, 5d, 8a, 8b, 15a, 15c, 18a, 18b, 105: Internal wiring line
6a, 6b, 6c, 6d, 16a, 16c: Innerlayer wiring line
7, 17, 104: Heat-generating electrode 9a, 9b, 19a, 19b, 103c: Connection pad
10, 110: Sensor device
20: Overall control section
31: First soot detecting section
32: Second soot detecting section
33: Third soot detecting section
34: Fourth soot detecting section
35: Fifth soot detecting section
36: Sixth soot detecting section
40: Heater control section
50: Temperature detecting section
60: Display section
102a: Principal face
103, 103A, 103B: Sensing electrode
103a, 103b: Opposed electrode portion
103c: Connection pad
103e, 103f: Surface electrode portion
104: Heat-generating electrode
106: Lead terminal
111: Power supply section
120, 121, 220, 320: Groove
120a: One side face
120b: Other side face
120c: Bottom face

The invention claimed is:

1. A sensor substrate, comprising:
an insulating substrate having a first surface;
sensing electrodes disposed in the insulating substrate, the sensing electrodes being columnar and being composed of at least two pairs of positive and negative sensing electrodes, in the at least two pairs of positive and negative sensing electrodes, a first part of a positive electrode and a second part of a negative electrode being each exposed from the first surface of the insulating substrate; and
innerlayer wiring lines embedded within the insulating substrate, the innerlayer wiring lines corresponding to the positive electrode and the negative electrode, respectively, in the at least two pairs of positive and negative sensing electrodes,
wherein the innerlayer wiring lines comprises first lines corresponding each of the positive electrode in the at least two pairs of positive and negative sensing electrode and comprises second lines corresponding each of the positive electrode in the at least two pairs of positive and negative sensing electrode.

2. The sensor substrate according to claim 1, wherein remaining parts of the at least two pairs of positive and negative sensing electrodes, exclusive of the first part of the positive electrode and the second part of the negative electrode, are embedded within the insulating substrate, and
the first part of the positive electrode is a first upper surface of the positive electrode and the second part of the negative electrode a second upper surface of the negative electrode, and the first upper surface and the second upper surface are exposed so as to be flush with the first surface of the insulating substrate.

3. The sensor substrate according to claim 1, wherein the sensing electrodes have a columnar shape which has an axis extending so as to intersect the first surface of the insulating substrate.

4. The sensor substrate according to claim 3, wherein the columnar shape of the sending electrodes is a circular cylinder, a quadrangular prism, or an octagonal prism.

5. The sensor substrate according to claim 4, wherein the first part of the positive electrode and the second part of the negative electrode are similar to each other in shape.

6. The sensor substrate according to claim 1,
wherein each of the first lines and the second lines is connected to an outside.

7. The sensor substrate according to claim 1, further comprising:
a heat-generating electrode embedded within the insulating substrate.

8. A sensor device, comprising:
the sensor substrate according to claim 1; and
a power source which supplies electric power to the at least one pair of positive and negative sensing electrodes via the innerlayer wiring lines.

9. A sensor substrate, comprising:
an insulating substrate having a first surface;
sensing electrodes disposed in the insulating substrate and composed of at least one pair of positive and negative sensing electrodes; and
innerlayer wiring lines embedded within the insulating substrate and corresponding to the positive electrode and the negative electrode, respectively, in the at least one pair of positive and negative sensing electrodes,
wherein, in the at least one pair of positive and negative sensing electrodes, a first part of a positive electrode and a second part of a negative electrode being each exposed from the first surface of the insulating substrate, and
the insulating substrate is provided with a groove located between the at least one pair of positive and negative sensing electrodes, the groove being opened to the first surface and being concaved from the first surface.

10. The sensor substrate according to claim 9, wherein the at least one pair of positive and negative sensing electrodes is a pair of columnar sensing electrodes disposed so as to face the groove.

11. The sensor substrate according to claim 10, wherein the at least one pair of positive and negative sensing electrodes extends to a bottom-side end of the groove.

12. The sensor substrate according to claim 10, wherein, in the groove, an opening width is larger than a bottom width.

13. A sensor device, comprising:
the sensor substrate according to claim 10; and
a power supply section which supplies a potential to the at least one pair of positive and negative sensing electrodes.

14. The sensor substrate according to claim 10, wherein, in a plane view, an outer edge of the groove surrounds the at least one pair of positive and negative sensing electrodes.

15. The sensor substrate according to claim 10, wherein said groove additionally comprises an inner surface, and wherein each of said pair of columnar sensing electrodes comprises an outer side, each said outer side being kept in contact with said inner surface of said groove.

* * * * *